United States Patent
Sakano

(10) Patent No.: US 7,240,351 B2
(45) Date of Patent: Jul. 3, 2007

(54) TRAY CARRYING-IN STARTING MECHANISM FOR DISK DRIVE

(75) Inventor: Kenji Sakano, Fukui (JP)

(73) Assignee: Orion Electric Co., Ltd., Fukui (JP)

(*) Notice: Subject to any disclaimer, the term of this patent is extended or adjusted under 35 U.S.C. 154(b) by 357 days.

(21) Appl. No.: 10/901,093

(22) Filed: Jul. 29, 2004

(65) Prior Publication Data

US 2005/0028178 A1 Feb. 3, 2005

(30) Foreign Application Priority Data

Jul. 30, 2003 (JP) ............................. 2003-203479

(51) Int. Cl.
*G11B 17/03* (2006.01)
(52) U.S. Cl. ..................... 720/607; 74/32; 74/422; 74/435
(58) Field of Classification Search ........ 720/601–603, 720/606–607, 613; 74/32, 89.17, 422, 435
See application file for complete search history.

(56) References Cited

U.S. PATENT DOCUMENTS 4,697,259 A * 9/1987 Takanashi .................. 720/607

6,345,027 B1 * 2/2002 Saji et al. ................... 720/607
2002/0031080 A1 * 3/2002 Inoue .......................... 369/291

FOREIGN PATENT DOCUMENTS

| EP | 813195 A2 | * 12/1997 |
| JP | 3088851 | 7/2002 |
| JP | 2002288916 A | * 10/2002 |

* cited by examiner

*Primary Examiner*—Wayne Young
*Assistant Examiner*—Nathan Danielsen
(74) *Attorney, Agent, or Firm*—Wenderoth, Lind & Ponack, L.L.P.

(57) ABSTRACT

A tray carrying-in starting mechanism for a disk drive is simple and reduces a load at the start of carrying-in of the tray. The tray carrying-in action is started by pushing a tray that has been carried out to a disk exchange position. The starting mechanism comprises a projection provided on a rear end portion of a rack with a predetermined spacing from a tooth at a rear end of the rack. An untoothed portion is provided on an outer periphery of the gear that meshes with the rack, and a cam groove is formed on the outer periphery of the gear to allow the projection to slide over a predetermined extent and to engage therewith. The projection engages with the cam groove when the tray is carried out to the disk exchange position, and the tray can be retracted a predetermined distance without rotation of the gear when the tray is pushed.

2 Claims, 4 Drawing Sheets

Fig. 3(a)
Fig. 3(b)
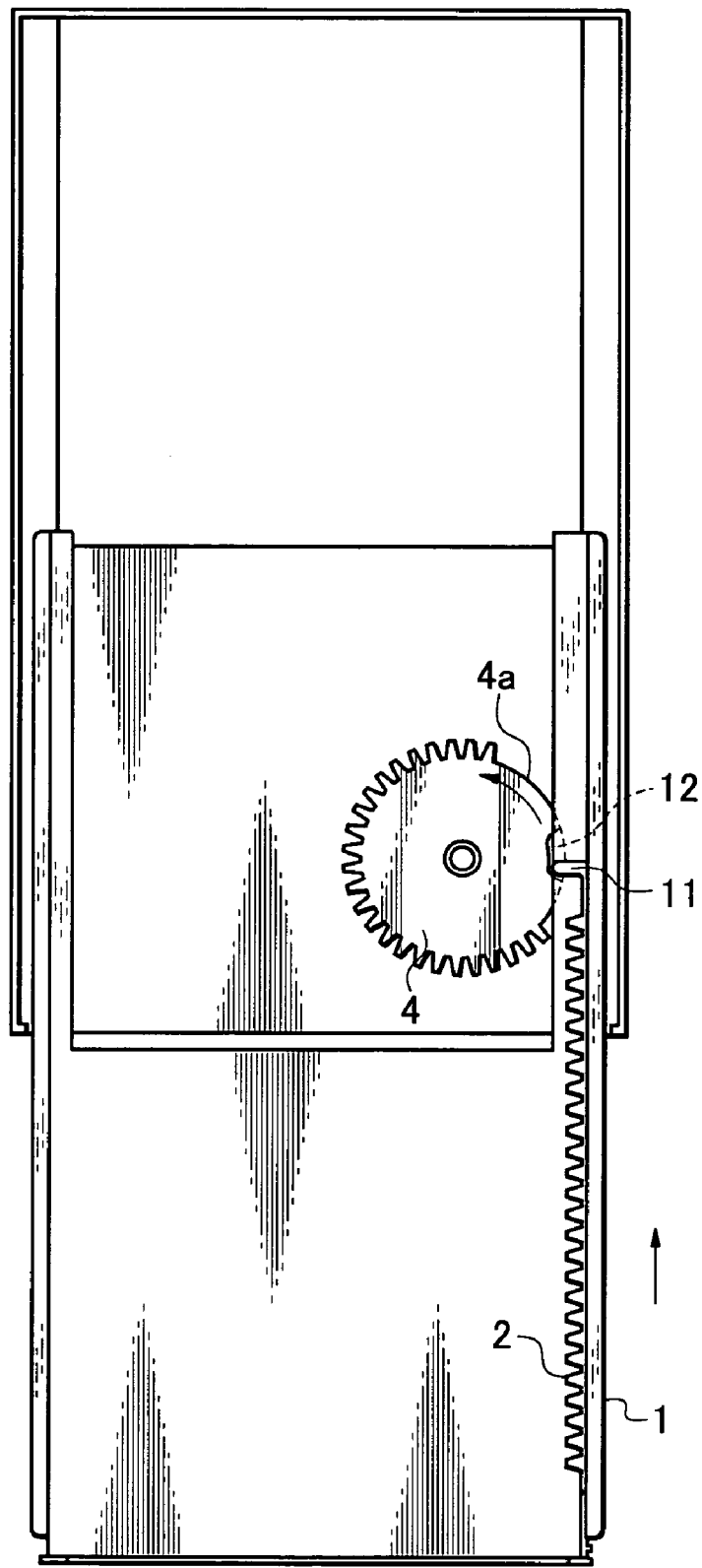
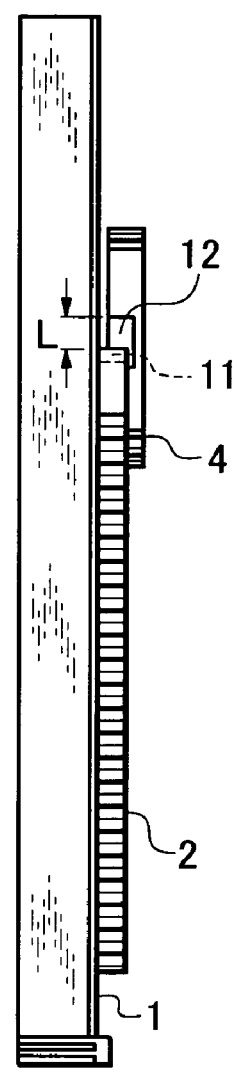

TRAY CARRYING-IN STARTING MECHANISM FOR DISK DRIVE

BACKGROUND OF THE INVENTION

1. Field of the Invention

The present invention relates to a tray carrying-in starting mechanism in a disk drive for reproduction/recording of optical disks and magnet-optical disks, such as CD, DVD, MD, etc.

2. Related Art

A disk drive for reproduction of a CD, DVD, etc. comprises a tray that receives thereon a disk and carries it in and out, a drive unit for rotation of the disk, a pickup, and a feeding device to move the pickup. The respective constituent parts are provided with motors needed for the movements thereof and can perform necessary movements through the respective motors.

A tray that receives thereon a disk to carry the disk in and out of a disk drive body is driven by a motor; a gear meshes with a rack that is provided on a side of the tray, and the gear is rotatively driven by a motor. In the case where a tray is present in a disk exchange position and is to be carried into a disk drive, an operating button may be made ON to drive the motor, but mounting the operating button on a front panel gives rise to a need for a substrate and a switch, which results in an increase in cost.

In some cases, when a tray is pushed by hand to retreat slightly, the position of the tray is detected and a motor is started to carry the tray into the disk drive. However, such a tray carrying-in mechanism is constructed such that when a tray is caused to retreat, the gear meshing with the rack is rotated and the gear interlocks with a gear mounted to a spindle of a motor. Accordingly, a load of a certain magnitude acts in retracting the tray to give rise to a weight, thus worsening the operability of the tray.

For example, a "disk recording/reproduction apparatus" according to JP-U-3088851 is known as a tray carrying-in mechanism constructed to retract with a light push force in order to reduce the load on the tray. With such an apparatus, a rail is provided in a tray accommodating section in the disk drive body, the rack is provided on the tray, a rear end portion of the rack is untoothed, and a rack piece is mounted slidably on the rack in a manner so as to overlap the untoothed portion. Leaf springs are mounted on both sides of a rear portion of the tray whereby the tray can be pushed with a slight force, which counteracts the bias of the leaf springs, because the rack and a pinion connected to a drive shaft of the motor are out of mesh with each other when the tray is to be pushed in.

However, such disk recording/reproduction apparatus needs a rack piece, the rack piece must be mounted overlappingly on the rack to be slidable thereon, and the number of parts and manhours in the work of assembling the rack piece are increased. Further, a mechanism is provided such that a slot is formed to allow a tray piece to slide in a predetermined range (L) when carrying-in and carrying-out the tray, and the tray piece collides against and interlocks with a pin provided upright on the tray, but collision noise is generated whenever ends of the slot collide against the pin. Occasionally, the rack piece is increased in slide resistance for some reason, resulting in the apparatus failing to function.

Also, while the leaf springs are used in the disk recording/reproduction apparatus to function to position the tray when carried out, there is the need for a unit to accommodate therein the leaf springs and the rail because the leaf springs are moved together with the tray. As a result, the apparatus is increased in width dimension. Further, an amount by which the tray projects and the timing at which the rack separates from the pinion are varied depending upon the positions in which the leaf springs are mounted, so that individual apparatuses give rise to dispersion so as to be degraded in quality. Further, since the leaf springs come into frictional contact with and slide on the rail when moving when carrying-in and carrying-out the tray, additional power is needed.

The tray carrying-in starting mechanism in conventional disk drives involves the problems described above. It is an object of the invention to solve such problems and to provide a tray carrying-in starting mechanism that is very simple and reduces the load at the start of carrying-in of a tray.

SUMMARY OF THE INVENTION

In order to attain the object, the invention provides a tray carrying-in starting mechanism for a disk drive in which a tray carrying-in action is started by pushing a tray to a disk exchange position. A gear rotatively driven by a motor meshes with a rack provided on a side of the tray. The starting mechanism comprising a projection provided on a rear end portion of the rack with a predetermined spacing from a tooth at a rear end of the rack. An untoothed portion is provided on an outer periphery of the gear that meshes with the rack, and a cam groove is formed on the outer periphery of the gear to allow the projection to slide over a predetermined extent and to engage therewith. The projection engages with the cam groove when the tray is carried out to the disk exchange position, and the tray can be retracted a predetermined distance without rotation of the gear when the tray is pushed.

The projection is provided on the same plane as that of the rack and projects to a large extent in the same direction as that of teeth of the rack so that the projection can surely engage with the cam groove in a limited space without generating slip.

When the projection collides against a rear end of the cam groove, the tray is carried out, and when the tray reaches the disk exchange position, the gear is reversed just before the projection comes into contact with a forward end of the cam groove. Accordingly, the disk exchange position of the tray is fixed, and when the rack is pushed, the rack can be retracted in a range of the cam groove without meshing with the gear. Accordingly, since the gear does not rotate in the meantime, a force required for pushing the tray is small and an improvement is achieved in operability.

BRIEF DESCRIPTION OF THE DRAWING

FIGS. 3(a) and 3(b) are a plan view and a right side view, respectively, showing a state just before carrying-in of a tray is started.

DETAILED DESCRIPTION OF PREFERRED EMBODIMENT

Figure 1:
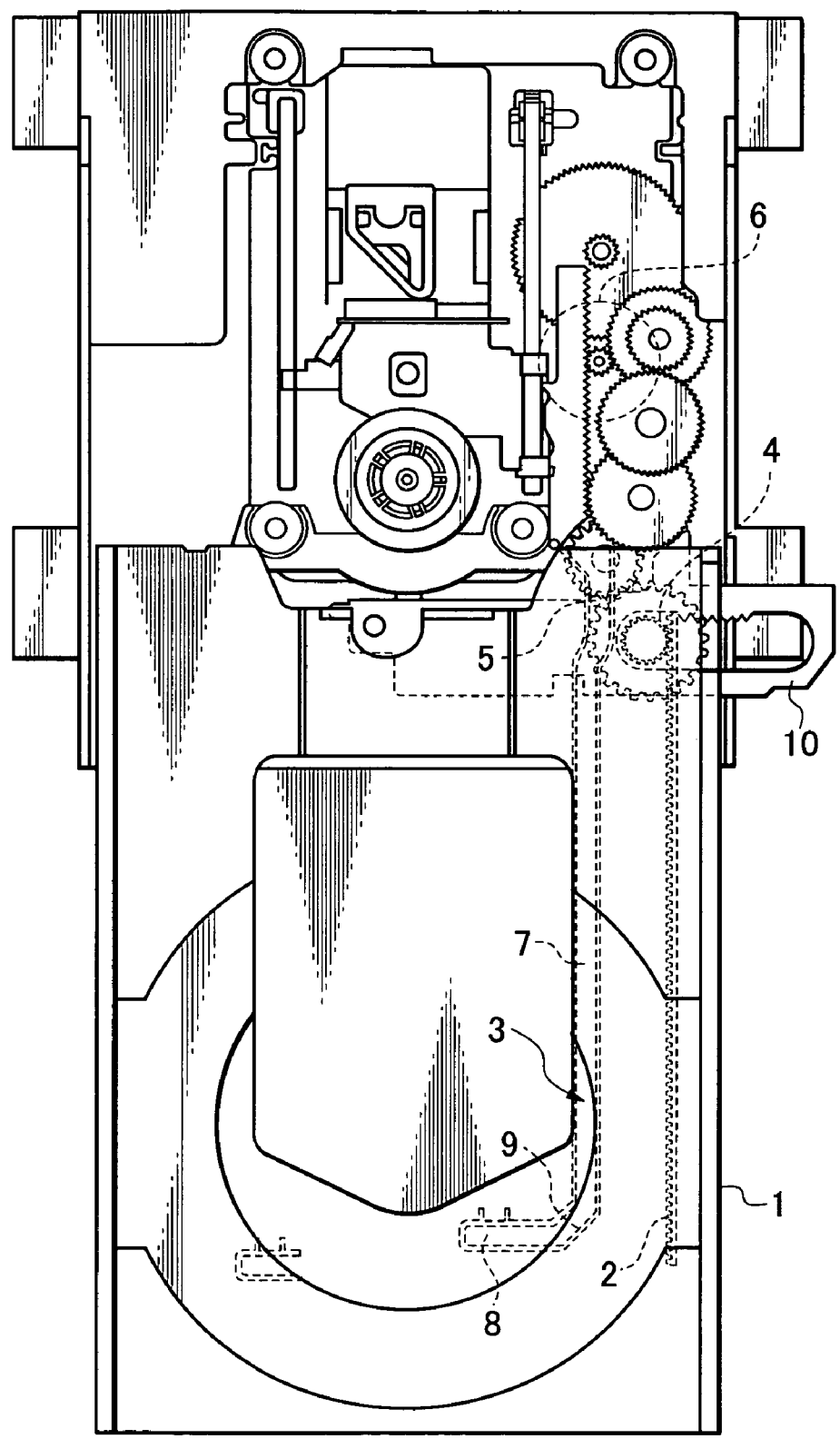
FIG. 1 is a plan view showing a state in which a tray has been carried out in a disk drive provided with a tray carrying-in starting mechanism according to the invention.

An embodiment of the invention will be described below in detail with reference to the drawings. FIG. 1 is a plan view showing a disk drive provided with a tray carrying-in starting mechanism according to the invention in a state in which a tray 1 is carried out and opened. The tray 1 is formed on an upper surface thereof with a disk placing surface that is circular in shape and recessed to be shallow, and a disk is fitted and set on the disk placing surface. Also, a rack 2 is provided on a side of a lower surface of the tray 1 in a longitudinal direction, and a substantially L-shaped guide groove 3 is formed along the rack 2.

A gear 4, rotatively driven by a motor 6, meshes with the rack 2. The gear 4 is rotatively driven to carry the tray 1 into and out of a disk drive. A cam-rod projection 5 provided on and projecting from a cam rod 10, which is arranged in a front part of a cam unit so as to be able to reciprocate laterally, is loosely fitted into the guide groove 3. The guide groove 3 comprises a longitudinal groove portion 7 formed in parallel to the rack 2, a transverse groove portion 8 formed at a right angle relative to the rack 2, and a corner groove portion 9 formed obliquely between the longitudinal groove portion 7 and the transverse groove portion 8. Also, a rear end portion of the longitudinal groove portion 7 extends slightly offset with a curved portion midway.

Accordingly, when the tray 1 is carried out to be advanced, the tray 1 stops in a location where the cam-rod projection 5, loosely fitted into the longitudinal groove portion 7, comes to the curved portion. Also, when the tray 1 is carried in so as to retract, the tray 1 stops in a location where the cam-rod projection 5 comes to the corner groove portion 9. That is, when the cam-rod projection 5 moves along the guide groove 3, the cam rod 10 is moved, which movement is detected to cause the tray 1 to stop.

By pushing an eject button provided on a front panel, the motor 6 is started to rotate the gear 4 to move forward the rack 2 and to carry out the tray 1 so as to stop the same in a disk exchange position. On the other hand, when the tray 1 present in the disk exchange position is to be carried to a disk reproduction position, or a disk standby position in the disk drive, a tip end of the tray is pushed to retract, the motor 6 is started by detecting such movement of the tray 1, and the gear 4 is rotated to feed the rack 2.

Figure 2A:
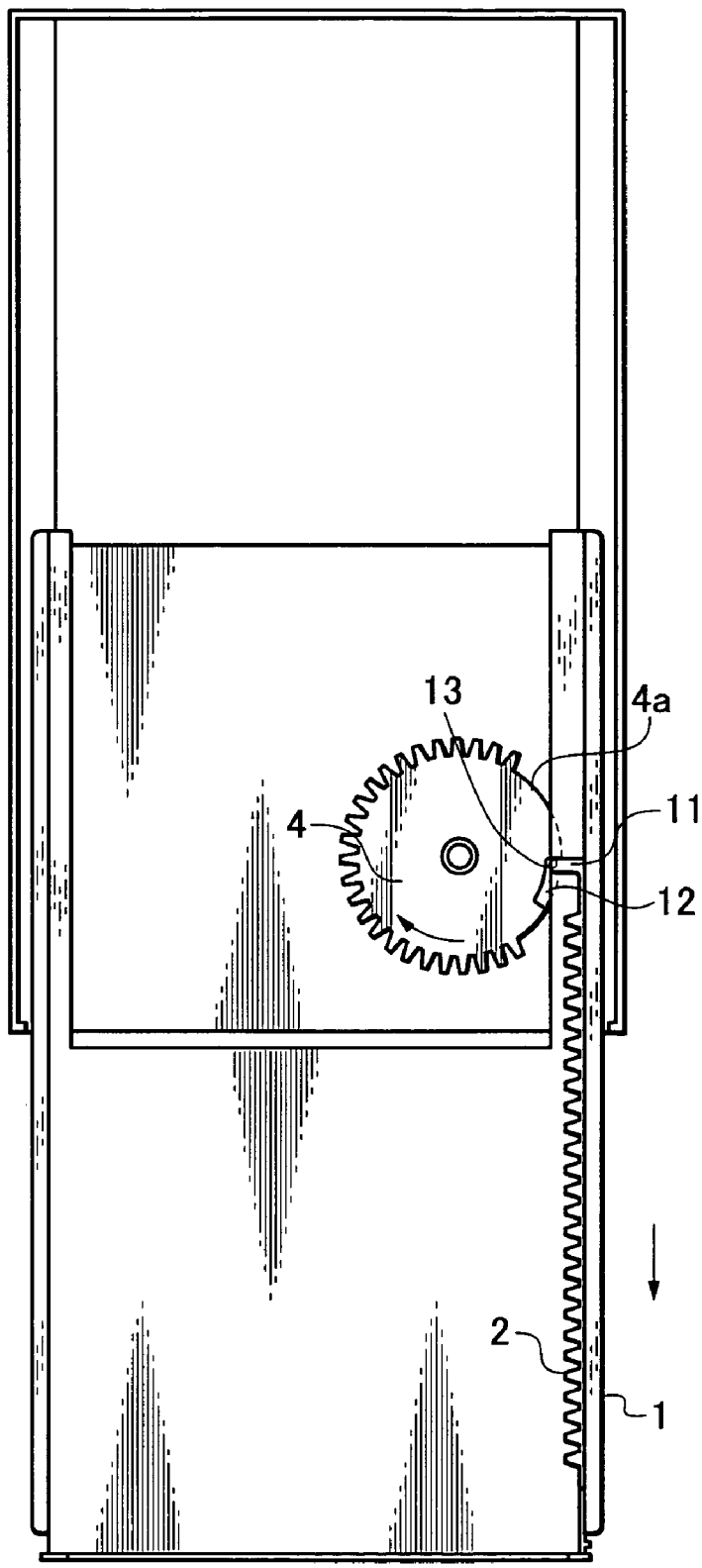
FIGS. 2(a) and 2(b) are a plan view and a right side view, respectively, showing a state in which carrying-out of a tray has been completed in the tray carrying-in starting mechanism according to the invention.
Figure 2B:
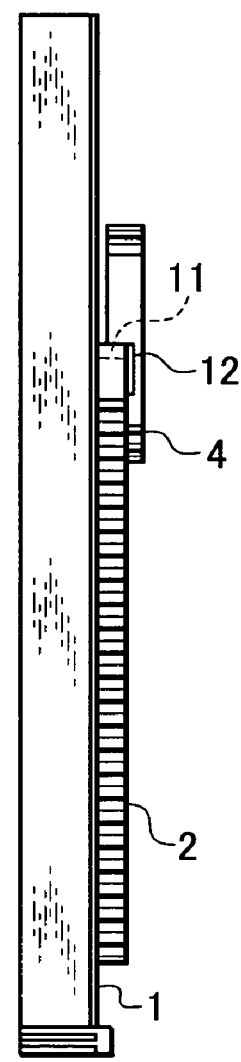

FIGS. 2(a) and 2(b) show an embodiment of the tray carrying-in starting mechanism according to the invention. The figures show a state in which carrying-out of the tray 1 has been completed and the tray is present in the disk exchange position. The rack 2 meshed with the gear 4 to be carried out by virtue of rotation of the gear 4, and the teeth of the rack disappear at a predetermined position on a rear end of the rack so as to be out of mesh with the gear 4.

A projection 11 is provided on the same plane as that of the rack 2 on a rear part of the rack 2 so as to be distant a predetermined spacing from a tooth at the rear end of the rack and to project toward the gear 4. An untoothed portion 4a is formed on an outer periphery of the gear 4, and a cam groove 12 is formed by cutting out that part of the untoothed portion 4a, which is sector-shaped in a circumferential direction and has a predetermined width. The projection 11 and the cam groove 12 are positioned in a manner to engage with each other in synchronism with the timing at which the gear 4 is rotated to carry out the tray 1 and is made out of mesh with the rack 2 and the rack 2 separates from the gear 4. The tray 1 stops when the cam groove 12 engages with the projection 11 and the gear 4 is rotated slightly. At this time, the projection 11 contacts with a rear end 13 of the cam groove 12 (see FIG. 2(a)).

FIGS. 3(a) and 3(b) show the case where the tray 1 is carried into the disk drive. The projection 11 is fitted into the cam groove 12 of the gear 4, and a distance L with the projection 11 loosely fitted is provided between the projection 11 and the rear end 13 of the cam groove 12. By pushing the tray 1 in a direction indicated by an arrow, that is, in a direction toward a body of the disk drive, the tray 1 is caused to retreat as far as the projection 11 is present in an extent of the distance L but the gear 4 is not rotated, and when the tray retreats by the distance L, the projection 11 collides against the rear end 13 to start rotation of the gear 4. Accordingly, it suffices that a load with which a finger pushes the tray 1 to carry the same into the disk drive be very small. The gear 4 meshes with the rack 2 at the same time when the gear 4 begins rotation, and the motor 6 is started to rotatively drive the gear 4, thus enabling feeding of the rack 2.

Figure 4A:
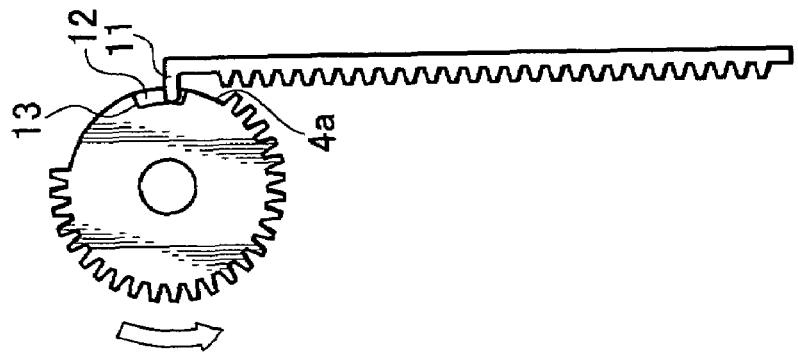
FIGS. 4(a) to 4(d) are plan views showing a state in which a gear and a rack mesh with each other in respective stages.
Figure 4B:
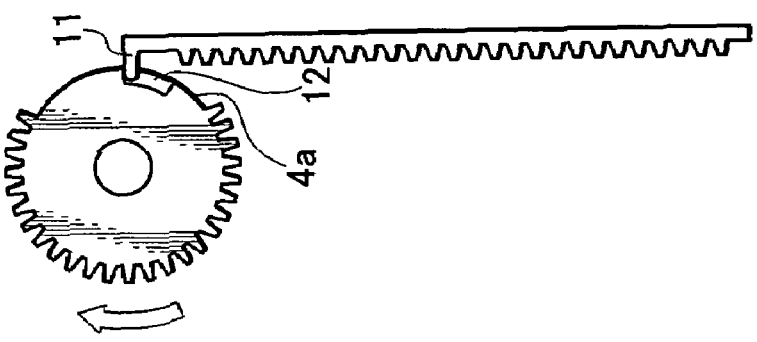

FIGS. 4(a) to 4(d) show the relationship between the gear 4 and the rack 2. FIG. 4(a) shows carrying-out of the tray 1, in which the gear 4 meshes with the rack 2, and the rack 2 and the tray 1 are carried out and moved with rotation of the gear 4. FIG. 4(b) shows a state in which the tray 1 is carried out to reach the vicinity of the disk exchange position and the gear 4 separates from the rack 2. That is, when the tooth at the rear end of the rack reaches the untoothed portion 4a, meshing of the gear 4 and the rack 2 is terminated and the projection 11 provided at the rear end portion of the rack engages with the cam groove 12 that is formed on the outer periphery of the untoothed portion of the gear 4.

Figure 4C:
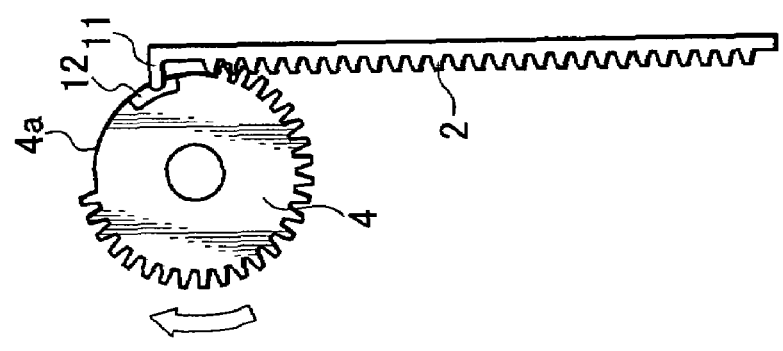
Figure 4D:
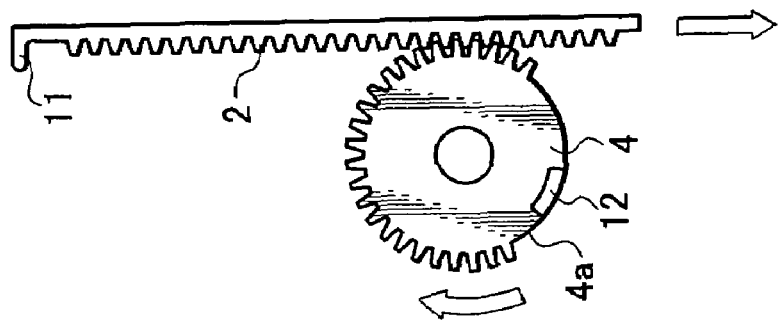

FIG. 4(c) shows a state in which the projection 11 engaging with the cam groove 12 is pushed out upon rotation of the gear 4, and the rack 2 and the tray 1 stop in a predetermined disk exchange position. When rotation of the gear 4 is stopped, the gear 4 is reversed to stop just before a forward end of the cam groove 12 comes into contact with the projection 11 (FIG. 4(d)). That is, the projection 11 collides against the rear end 13 of the cam groove 12 to be pushed out, and the gear is reversed an angle corresponding to an extent of the cam groove 12 to stop.

The rack 2 and the gear 4 are molded from a resin material, and molding is easy even when a gear comprises the untoothed portion 4a and the cam groove 12. Also, the invention is applicable to a disk drive with a disk exchanger which comprises a plurality of trays.

As described above, with the tray carrying-in starting mechanism of the disk drive according to the invention, in case of pushing a tip end of the tray to retract the tray when the tray is to be carried in, the gear is not rotated, but stopped until the projection collides against the rear end of the cam groove, and the gear mechanism that rotatively drives the gear by means of a motor is not actuated, so that a load acting on the tray is small and the tray can be pushed with a light force to lead to an improvement in operability of the tray.

Also, since the projection provided on the rear part of the rack is on the same plane as that of the rack and projects in the same direction as that of the teeth of the rack, molding is facilitated and no additional space is needed.

Further, it suffices to provide the untoothed portion on a part of the gear and to form the cam groove, but any specific parts are not needed and the number of parts is the same as that in conventional tray carrying devices. Further, just by restricting a rotating angle of the gear, a disk exchange position, in which the tray is carried out, can be fixed.

What is claimed is:

1. A tray carrying-in starting mechanism for a disk drive having a gear that can be rotatably driven by a motor and that meshes with a rack provided on a side of a tray such that a tray carrying-in action can be started by pushing the tray when the tray is at a disk exchange position, said tray carrying-in mechanism comprising:
   a projection provided on a rear end portion of the rack with a predetermined spacing from a rearward most tooth of the rack;
   an untoothed portion on an outer periphery of the gear; and
   a cam groove formed on the outer periphery of the gear so as to allow said projection to slide over a predetermined extent and to engage therewith so that said projection can engage with said cam groove when the tray is at the disk exchange position and so that the tray can retract a predetermined distance without rotation of the gear when the tray is pushed.

2. The tray carrying-in starting mechanism for a disk drive according to claim 1, wherein said projection is provided on the same plane as the rack and projects in the same direction as that of teeth of the rack.

* * * * *